United States Patent
Ozanne

(10) Patent No.: US 11,793,348 B2
(45) Date of Patent: Oct. 24, 2023

(54) PROCESS OF PREPARATION OF TEA

(71) Applicant: SOCIETE DES PRODUITS NESTLE S.A., Vevey (CH)

(72) Inventor: Matthieu Ozanne, Publier (FR)

(73) Assignee: Societe des Produits Nestle S.A., Vevey (CH)

(*) Notice: Subject to any disclaimer, the term of this patent is extended or adjusted under 35 U.S.C. 154(b) by 902 days.

(21) Appl. No.: 16/610,345

(22) PCT Filed: May 1, 2018

(86) PCT No.: PCT/EP2018/061085
§ 371 (c)(1),
(2) Date: Nov. 1, 2019

(87) PCT Pub. No.: WO2018/202650
PCT Pub. Date: Nov. 8, 2018

(65) Prior Publication Data
US 2020/0085227 A1 Mar. 19, 2020

(30) Foreign Application Priority Data

May 3, 2017 (EP) ..................................... 17169200

(51) Int. Cl.
*A47J 31/36* (2006.01)
*A47J 31/46* (2006.01)
(Continued)

(52) U.S. Cl.
CPC ......... *A47J 31/3695* (2013.01); *A47J 31/002* (2013.01); *A47J 31/0615* (2013.01);
(Continued)

(58) Field of Classification Search
None
See application file for complete search history.

(56) References Cited

U.S. PATENT DOCUMENTS 4,800,805 A * 1/1989 Mahlich .............. A47J 31/4489
99/323.1
4,882,983 A * 11/1989 Pastrick .............. A47J 31/0573
99/295

(Continued)

FOREIGN PATENT DOCUMENTS

CN 103719286 A 4/2014
CN 204931329 U 1/2016

(Continued)

*Primary Examiner* — John J Norton
(74) *Attorney, Agent, or Firm* — K&L Gates LLP

(57) ABSTRACT

The invention concerns a process for preparing a tea in a drinking receptacle with a tea brewing machine, said machine being configured:—to brew tea from a capsule, said capsule comprising tea leaves, by introducing hot water in said capsule and dispensing brewed tea from the capsule in the drinking receptacle, and—to pump and heat water and dispense hot water to the capsule, wherein said process comprises a step of pasteurization of tea leaves inside the capsule before dispensing brewed tea from the capsule inside the drinking receptacle, wherein said pasteurization step comprises the sub-steps of: p1)—introducing hot water in the capsule until all the tea leaves are submerged by hot water inside the capsule and stopping water introduction before tea is dispensed therefrom in the drinking receptacle, then p2) keeping all the tea leaves submerged in hot water during a period of time, wherein the temperature of hot water introduced in sub-step p1) and the sum of the periods of time of sub-steps p1) and p2) before dispensing tea from the capsule are set to pasteurize the tea leaves comprised in the capsule.

14 Claims, 6 Drawing Sheets

(51) Int. Cl.
*A47J 31/52* (2006.01)
*A47J 31/44* (2006.01)
*B65D 85/804* (2006.01)
*A47J 31/06* (2006.01)
*A47J 31/00* (2006.01)

(52) U.S. Cl.
CPC ......... *A47J 31/4489* (2013.01); *A47J 31/461* (2018.08); *A47J 31/468* (2018.08); *A47J 31/5253* (2018.08); *B65D 85/8043* (2013.01)

(56) References Cited

U.S. PATENT DOCUMENTS

| | | | |
|---|---|---|---|
| 10,743,707 | B2 | 8/2020 | Bugnano et al. |
| 10,973,364 | B2 | 4/2021 | Hesselbrock et al. |
| 2006/0236874 | A1* | 10/2006 | Ozanne ............... A47J 31/4485 99/452 |
| 2011/0192287 | A1* | 8/2011 | Riessbeck ............... A47J 31/60 134/22.12 |
| 2011/0250333 | A1 | 10/2011 | Ozanne |
| 2012/0167774 | A1 | 7/2012 | Mordini et al. |
| 2012/0251670 | A1* | 10/2012 | Kamerbeek ........... A47J 31/407 426/77 |
| 2013/0095214 | A1* | 4/2013 | Ozanne .............. B65D 85/8061 99/275 |
| 2015/0250352 | A1* | 9/2015 | Ozanne ................. A47J 31/465 99/300 |
| 2015/0305551 | A1* | 10/2015 | Rosati .................... A47J 31/56 99/280 |
| 2016/0022087 | A1* | 1/2016 | Han ..................... A47J 31/465 99/283 |
| 2016/0270580 | A1 | 9/2016 | Smith |
| 2018/0008087 | A1* | 1/2018 | Miller .................. A47J 31/407 |

FOREIGN PATENT DOCUMENTS

| | | |
|---|---|---|
| EP | 2570059 | 3/2013 |
| EP | 2599412 | 6/2013 |
| EP | 2604547 | 6/2013 |

* cited by examiner

PROCESS OF PREPARATION OF TEA

CROSS REFERENCE TO RELATED APPLICATIONS

The present application is a National Stage of International Application No. PCT/EP2018/061085, filed on May 1, 2018, which claims priority to European Patent Application No. 17169200.7, filed on May 3, 2017, the entire contents of which are being incorporated herein by reference

FIELD OF THE INVENTION

The present invention relates to machines preparing tea from tea leaves capsules.

BACKGROUND OF THE INVENTION

Machines preparing beverages from single served capsules of beverage ingredient are common. Beverages like coffee, tea, chocolate with or without added milk can be easily prepared.

In the case of the preparation of tea with these machines, said tea beverage can be prepared from capsules comprising either instant tea powder or tea leaves. The preparation of tea with capsules comprising tea leaves is more complex because correct extraction of said tea leaves requires steps of wetting and soaking tea leaves and, accordingly, a step to temporize extraction. WO 2010/076263 describes this type of brewing process of tea leaves inside a capsule.

Compared to other plant ingredients like coffee, tea leaves present a particular issue concerning the presence of bacteria. Actually, contrary to coffee that is roasted at high temperature before being ground and filled in capsules for brewing, tea leaves are simply dried and then filled in capsules. None of these operations is able to kill the bacteria and, in addition, during these operations, tea leaves can be in contact with harmful substances. Consequently, during the brewing of tea leaves from capsule, it is essential that the tea beverage reaches a temperature sufficiently high and during a period of time such as to kill any possible bacteria. With current brewing of hot tea from tea capsules, this effect is systematically obtained inside the receptacle receiving the hot tea from the capsule. The temperature associated to the time to dispense the whole volume of tea inside the receptacle is sufficient to get a pasteurization "in cup". Generally the dispensing in a cup of a tea beverage at a brewing temperature of at least 70° C. during at least 20 seconds is sufficient.

A particular type of tea beverage is iced or cold brewed tea that is tea brewed generally at hot temperature and then immediately cooled with cold water or ice to decrease the temperature of the final tea beverage. In the case of preparation of hot tea from tea capsules, it would be easy to dispense hot brewed tea in a receptacle comprising ice cubes or to brew tea at a less hot temperature than hot tea in order to obtain iced tea rapidly. Yet, due to the presence of iced cubes or the use of less hot water, the pasteurization "in cup" process would not happen leading potentially to a health risk.

Another particular type of tea beverage is tea latte that is tea mixed with frothed milk. Tea latte is prepared by first frothing milk to get milk with a top layer of milk foam in a drinking receptacle and then introducing tea inside the receptacle. The resulting beverage presents two layers: a bottom layer of tea mixed with milk and a top layer of milk foam.

To prepare optimal tea latte, frothed milk is preferably prepared from fresh milk that is to say milk stored in fridge at a temperature inferior to 10° C. Although the milk can be frothed with steam or water, the final temperature of frothed milk remains inferior to 10° C. As a result, when tea is prepared from a capsule and is further introduced in said frothed milk, the temperature inside the cup is not sufficiently high to guarantee an effective pasteurization of tea and destruction of bacteria. Such a preparation of tea latte from a capsule comprising tea leaves is not recommended.

The frothing of fresh milk can be provided by different methods. One of the simplest in terms of cost is the frothing of milk in the drinking receptacle by pulses of hot water. WO 2009/144219 describes such a method for frothing fresh milk before introducing a coffee beverage inside said frothed milk. This method is implemented inside a machine wherein hot water for frothing milk in the drinking receptacle and hot water for preparing the coffee beverage are supplied by the same source of hot water. A solenoid valve dispenses hot water from the heater either to froth milk or to prepare coffee. As a result, such a machine does not induce expansive manufacturing costs. WO 2015/055460 describes an alternative method and apparatus wherein coffee is prepared from a capsule.

None of these methods is concerned with the issue of pasteurization of the coffee beverage. In particular, in these both methods, depending on the power and the capacity of the water heater, it may be difficult to supply hot water to the two different devices—that is the frothing nozzle and the beverage preparation device—successively. In particular water may not be hot enough and, in case of preparation of tea from a capsule, the issue about pasteurization raises again.

An object of the present invention is to provide a method for preparing a cold or iced tea or a tea latte with a capsule comprising tea leaves and to guarantee pasteurization and food safety of the beverage.

It would be advantageous to provide a beverage machine for preparing cold or iced tea or a tea latte with a capsule, said machine being manufactured at low costs.

SUMMARY OF THE INVENTION

In a first aspect of the invention, there is provided a process for preparing a tea in a drinking receptacle with a tea brewing machine, said machine being configured:
- to brew tea from a capsule, said capsule comprising tea leaves, by introducing hot water in said capsule and dispensing brewed tea from the capsule in the drinking receptacle, and
- to pump and to heat water and to dispense pumped hot water to the capsule, wherein said process comprises a step of pasteurization of tea leaves inside the capsule before dispensing brewed tea from the capsule inside the drinking receptacle, wherein said pasteurization step comprises the sub-steps of:
  p1) introducing hot water in the capsule until all the tea leaves are submerged by hot water inside the capsule and stopping water introduction before tea is dispensed therefrom in the drinking receptacle, then
  p2) keeping all the tea leaves submerged in hot water during a period of time, wherein the temperature of hot water introduced in sub-step p1) and the sum of the periods of time of sub-steps p1) and p2) before dispensing tea from the capsule are set to pasteurize the tea leaves comprised in the capsule.

The machine is configured to brew tea from a capsule, said capsule comprising tea leaves. Brewing happens by introducing hot water in the capsule and dispensing the resulting brewed tea from the capsule in the drinking receptacle.

The machine is configured to pump water and to heat pumped water and to dispense pumped hot water to the capsule.

Usually the machine comprises a valve means configured to control the time of introduction of pumped hot water, or even steam, to the capsule.

The process comprises a step of pasteurization of tea leaves inside the capsule before dispensing any brewed tea from the capsule in the drinking receptacle.

By pasteurization it is meant a process of killing all the harmful bacteria potentially present in tea leaves by heating of the tea leaves.

By implementing a pasteurization step of the tea leaves inside the capsule, before the brewed tea leaves the capsule, the temperature of the tea inside the final receptacle doesn't matter any longer and the brewed tea can be safely dispensed:
- in frothed milk present in the receptacle whatever the temperature of said milk, or
- above iced cubes present in the receptacle, or
- in additional water present in the receptacle said water being at ambient temperature or at a temperature inferior to 70° C.

The pasteurization step comprises the following successive sub-steps p1) and p2).

In step p1), hot water is introduced in the capsule until all the tea leaves are submerged by hot water in the capsule and water introduction is stopped before tea is dispensed therefrom in the drinking receptacle.

During step p1), all the tea leaves are submerged to make certain that all the tea leaves are submitted to pasteurization.

This effect can be obtained by the design of the capsule. According to the preferred embodiment, the capsule can present an overflow wall preventing tea from leaving the capsule as long as a certain volume of liquid is not introduced and the upper edge of the overflow wall is not reached. For example, WO 2007/042414 describes a type of capsule with overflow wall comprising at least one overflow aperture.

According to another embodiment, the capsule can comprise a discharge wall, wherein the discharge wall comprises discharge means which restrains the brewed liquid from being discharged from the capsule in case the pressure inside the enclosure of the capsule is below a predetermined value, and the discharge means enables the delivery of the brewed liquid in case the pressure exceeds said predetermined value. For example, WO 2012/035012 describes a type of capsule with discharge means such as:
- a discharge wall comprising at least one discharge opening comprising a hole which increases its section when the pressure inside the enclosure is rising, in particular at least one flexible valve such as a bicuspid-like valve, a tricuspid-like valve or a tetracuspid-like valve.
- a discharge wall made up of a flexible or elastic material such as a silicone membrane or an elastic fibres woven material.

Alternatively, this effect of submerging tea leaves can be reached by the configuration of the machine itself: in particular, the machine can comprise a beverage outlet downstream the outlet of the capsule and the said outlet can comprise a valve preventing liquid from leaving the capsule if the valve is not actuated.

During this step p1) of introduction of water, it is usually essential that tea is not immediately dispensed from the capsule in the drinking receptacle, because this step p1) is usually too short to guarantee that pasteurization has happened. Indeed as the volume of a capsule is usually quite small, usually inferior to 20 ml, the filling of the capsule to submerge tea leaves is implemented rapidly, usually in few seconds. Even if the temperature of water introduced in the capsule is high, this time length does not make sure that pasteurization has happened. The material the capsule is made of and the material the capsule cage is made of can impact the temperature inside the capsule. Similarly, the time between the preparation of the tea latte and the last preparation of a tea beverage with the machine can impact said temperature since the internal parts of the machine can be cold. Accordingly, the volume of water introduced in sub-step p1) shall not be immediately dispensed out of the capsule. Water introduction is stopped before the tea, that has just filled the capsule, is dispensed in the drinking receptacle.

Sub-step p1) is immediately followed by sub-step p2) wherein all the tea leaves are kept submerged in hot water during a period of time. This sub-step guarantees that pasteurization happens before tea is dispensed in the drinking receptacle.

The temperature of hot water introduced in sub-step p1) and the sum of the periods of time of sub-steps p1) and p2) are set to pasteurize the tea leaves comprised in the capsule. Generally the higher the temperature for pasteurization, the shorter the period of time for pasteurization. The minimum values of these parameters can depend from various factors such as: the nature of the material the capsule is made of, the shape and the internal volume of the capsule, the thickness of the wall of the capsule, the nature of the material the capsule cage is made of and/or the time since the last beverage preparation.

For example, for a plastic capsule presenting an internal volume of about 15 ml and comprising 1 to 3 g of tea leaves, the temperature of hot water inside the capsule in sub-step p1) is preferably of at least 70° C.

Preferably, the capsule is made of a plastic material. It has been noticed that this material avoids a drop of temperature during the time of the pasteurization and guarantees said pasteurization, specifically if the volume of the capsule is small that is to say inferior to 20 ml.

Preferably, for a capsule made of a plastic material and presenting an internal volume inferior to 20 ml, the temperature of hot water introduced at sub-step p1) is set to get a temperature of 70° C. in the capsule during the sum of the periods of time of sub-steps p1 and p2, and said sum is of at least 15 seconds.

According to the preferred embodiment, for a capsule made of a plastic material and presenting an internal volume inferior to 20 ml, the temperature of hot water introduced at sub-step p1) is set to get a temperature of 75° C. in the capsule during the sum of the periods of time of sub-steps p1 and p2, and said sum is of at least 7 seconds.

Apart from the pasteurization effect, the implementation sub-step p2) provides too a period to enable tea leaves to soak in hot water, facilitating the wetting of dried tea leaves and the opening of dried tea leaves and improving the extraction of tea.

Preferably, the pasteurisation step can comprise a sub-step p0) before the sub-step p1) and, during said sub-step p0), water steam is introduced inside the capsule.

The introduction of steam aims essentially to heat the capsule and the brewing cage holding the capsule before hot water is introduced at sub-step p1). As a result, the material the capsule is made of absorbs less heat of the hot water introduced at sub-step p1) and at sub-step p2) and the pasteurisation is more efficient because there is less important decrease of temperature inside the capsule during the steps p1 and p2. In particular the period of time the tea leaves are kept submerged can be shorter than in absence of steaming before step p1).

In one embodiment, the process is implemented with a machine configured:
  to froth milk present in the drinking receptacle by jetting hot water from at least one hot water nozzle in the milk, and
  to pump water and heat pumped water and dispense pumped hot water to the nozzle, and the process comprises a milk frothing step wherein milk present in the drinking receptacle is frothed by jetting hot water from the at least one hot water nozzle, and
this process implements the step of pasteurization of tea leaves inside the capsule before dispensing brewed tea from the capsule in the frothed milk inside the drinking receptacle.

The process of this embodiment relates to preparation of tea latte. By tea latte, it is meant a beverage comprising the mixture of tea and frothed milk. Generally, this mixture is obtained by introducing tea in a receptacle comprising frothed milk so that the visual effect of tea merging with milk under the layer of milk froth can be observed.

The process is prepared with a machine configured to froth milk present in a drinking receptacle by jetting hot water from at least one hot water nozzle in the milk.

Usually the machine comprises a valve means configured to supply pumped hot water either to the capsule to brew tea only or to the nozzle to froth milk only. The machine does not enable the simultaneous supply of pumped hot water to the capsule and to the nozzle. As a result, a simple three way valve can be used and the machine is not expansive in terms of manufacturing cost.

The process comprises the pasteurisation step such has described above and a milk frothing step wherein milk present in the drinking receptacle is frothed by jetting hot water from the at least one hot water nozzle. The frothing step is implemented before tea is dispensed from the capsule in the receptacle comprising frothed milk. This step can happen before or simultaneously to the pasteurisation step. This step can also be divided in separate sub-steps one happening before the pasteurisation step and another simultaneously to the pasteurisation step.

According to the preferred embodiment, at least a part of said milk frothing step happens during sub-step p2) of the pasteurization step.

Due to the implementation of sub-step p2), which is a temporisation step during which no water is introduced in the capsule, the supply of hot water can be used during the period of said sub-step p2) to froth milk in the drinking receptacle. Actually, hot water is able to be supplied to the at least one nozzle and to be jetted in milk present in the drinking receptacle. An advantage provided by frothing milk during sub-step p2) is that the consumer who has initiated the preparation of the tea latte can see the machine operating and does not have the feeling that nothing happens during temporization.

According to the above preferred embodiment, a part of the milk frothing step can happen before the step of pasteurization begins. As a result, the frothing of milk is implemented in two separate sub-steps, one step happening before the step of pasteurization begins and another step happening during the sub-step p2) of the pasteurization.

Implementing the frothing of milk in two different sub-steps guarantees that water is supplied at the right temperature for said frothing. Indeed, depending on the nature of the heater, the heater may not be able to provide sufficient hot water during a long period of time.

Accordingly, the water heater is able to provide hot water for at least the three main steps that are: the first frothing step, the filling of the capsule during sub-step p1) and the second frothing step, these steps happening at three different separate moments. As the filling of the capsule requires a small volume of hot water only and it does not need to be supplied at high flow rate, the water heater is able after this step to heat water at the right temperature for the further step of frothing. There is sufficient time during step p1) to enable the heater to provide the right volume of water at the right temperature.

Generally, the temperature of hot water introduced in milk during the milk frothing step is of at least 70° C.

Generally, the flow of hot water introduced during the milk frothing step is of at least 250 ml/min.

Preferably, the process is implemented with a capsule comprising:
  an enclosure containing tea leaves,
  an overflow wall at the beverage outlet side of the capsule, said wall comprising at least one overflow aperture,
and with a tea brewing machine configured to receive the capsule and to orient the capsule with the at least one overflow aperture positioned upwardly inside the machine.

Due to the presence of the overflow wall, the capsule can be filled with water till the level of the overflow aperture and water can be retained in the capsule as long as no further water is introduced and leads to overflow through the overflow aperture. Accordingly, tea leaves can be submerged by water under the overflow aperture level. Preferably, the overflow aperture is positioned close to the upper point of the capsule based once the capsule is positioned in the brewing unit of the machine.

Preferably the capsule comprises a filter. The filter retains tea leaves and fines in the capsule during the dispensing of tea. For example, a capsule such as described in WO 2007/042414 can be used.

According to a second aspect, there is provided a beverage machine for preparing tea beverages from tea leaves capsules, said machine comprising:
  a tea leaves capsule brewing unit,
  a hot water supply unit, said unit comprising at least: a water tank, a water pump, a water heater,
  a control process unit configured for controlling the pump and the heater to implement the process comprising pasteurisation step such as described above.

The tea leaves capsule brewing unit is configured for brewing tea from the capsule comprising tea leaves by injection of hot water inside the capsule.

Generally, the tea leaves capsule brewing unit comprises a capsule cage to receive and position the capsule inside the machine.

The brewing unit usually comprises a water needle to introduce water inside the capsule once the latter is positioned in the capsule cage. The needle can also be used to pierce an inlet inside the capsule. For example, a needle such as described in EP-A1-2 080 454 can be used.

Optionally, the machine can comprise:
  a water nozzle and a valve means configured for connecting the pumped hot water to said water nozzle, a control process unit configured to control the pump, the heater and the valve means in order to implement the process comprising pasteurisation step and milk frothing step such as described above.

The nozzle of the machine is designed to dispense a jet of water for frothing milk. Generally the nozzle is a simple conduit presenting an outlet end sufficiently small to create a jet of water. While flowing through the outlet end, water reaches a sufficient velocity and therefore a sufficient kinetic energy to provide high shear forces on the surface of the beverage. The outlet end of the conduit can present a section equivalent to the section of circle of a diameter comprised between 0.2 and 1.0 mm, preferably between 0.3 and 0.9 mm, even more preferably between 0.6 to 0.8 mm.

In a particular embodiment, the nozzle can comprise several conduits. In this latter case, preferably, the sections of the outlet ends present identical value and the sum of the sections presents the same value as the section of a unique conduit outlet end presenting a diameter comprised between 0.2 and 1 mm.

In the preferred embodiment of the machine:
the brewing unit comprises a needle to inject hot water in the capsule and a check valve at the water inlet of the needle, and
the valve means of the hot water supply unit is a distributor valve feeding hot pumped water to the brewing unit by default, and
the control process unit is configured to switch off the heater during the pasteurization step except during the milk frothing step happening during sub-step p2) of the pasteurization step. In said preferred embodiment, the check valve at the water inlet of the needle guarantees that the hot water supply line remains closed when hot water is not pumped upstream any longer. In particular, this check valve prevents that any dead volume of water remaining in the pipes of the machines upstream of the capsule may be contaminated, for example by bacteria originating in and/or migrating into the dead volume from a used capsule, which has not yet been ejected or removed from the beverage preparation machine. Such a check valve can be the valve described in WO 2014/053439.

In said preferred embodiment, the valve means of the hot water supply unit is preferably a three way solenoid valve feeding hot pumped water to the brewing unit when not energised and feeding hot pumped water to the frothing nozzle when energized.

With the above configuration of the machine, preferably the control process unit of the machine is configured to switch off the heater during the pasteurization step except during the milk frothing step happening during sub-step p2) of the pasteurization step. Indeed, it has been observed that with the above configuration of the machine, the heater may generate steam while it heats. Due to the direct connection with the capsule brewing unit, said steam may pressurize water present in the line between the heater and the check valve and may urge this pressurized water to open the check valve during sub-step p2) leading to the introduction of water in the capsule. This introduction of water in the capsule is not desired during the pasteurization step after step p1 happened. Indeed, this water may lead to the dispensing of tea in the drinking receptacle from the capsule before the time for pasteurization has elapsed. To avoid this risk of steam generation, it is preferred to switch off the heater during the pasteurization step, except for the milk frothing step happening during sub-step p2) of the pasteurization step. Actually, for this milk frothing step, the distributor valve is actuated to dispense hot water to the frothing nozzle without any risk to dispense more water to the capsule brewing unit.

This preferred embodiment is particularly suited for a machine brewing tea from a tea leaves capsule, said capsule comprising:
an enclosure containing tea leaves,
a filter,
an overflow wall at the beverage outlet side of the capsule, said wall comprising at least one overflow aperture, and wherein the tea brewing unit of the machine is configured for orienting the capsule with the at least one overflow positioned upwardly.

According to a third aspect, there is provided a system of a machine such as described above and a tea leaves capsule, said capsule comprising:
an enclosure containing tea leaves,
an overflow wall at the beverage outlet side of the capsule, said wall comprising at least one overflow aperture, wherein the tea brewing unit of the machine is configured to orient the capsule with the at least one overflow positioned upwardly.

The above aspects of the invention may be combined in any suitable combination. Moreover, various features herein may be combined with one or more of the above aspects to provide combinations other than those specifically illustrated and described. Further objects and advantageous features of the invention will be apparent from the claims, from the detailed description, and annexed drawings.

BRIEF DESCRIPTION OF THE DRAWINGS

The characteristics and advantages of the invention will be better understood in relation to the following figures.

DETAILED DESCRIPTION OF THE DRAWINGS

Figure 1:
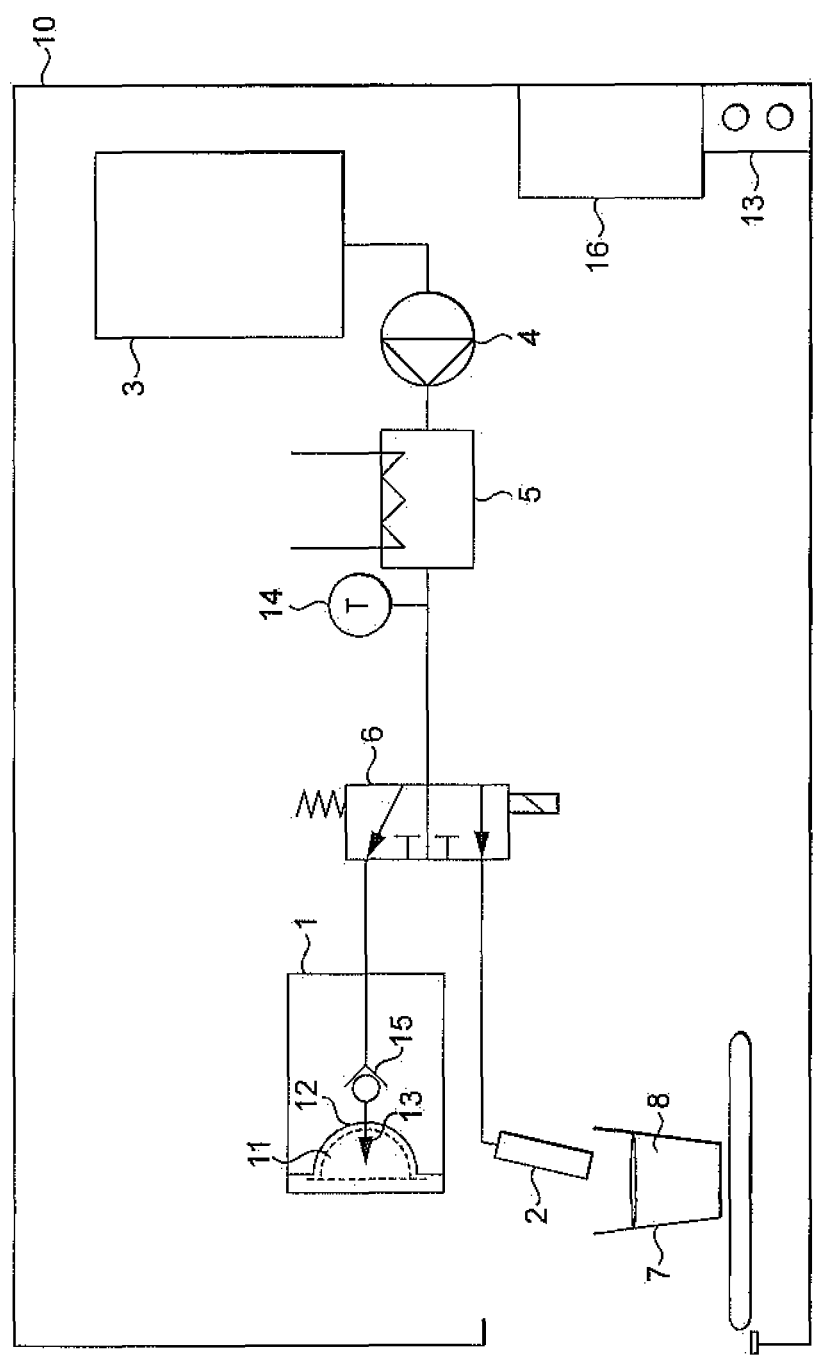
FIG. 1 illustrates a machine for implementing the process of the present invention.

FIG. 1 illustrates schematically a machine 10 for implementing the process of the present invention.

The machine comprises a tea brewing unit 1. The brewing unit is configured to receive a capsule 11 comprising tea leaves, to prepare brewed tea therefrom and to dispense said tea in a drinking receptacle 7 positioned on a drip tray 9 under the brewing unit outlet. The tea brewing unit 1 comprises a capsule cage 12 to receive and position the capsule 11 for the brewing operation. In particular the capsule cage comprises a water injector or needle 13 to introduce hot water in the capsule 11.

The machine comprises a nozzle 2 positioned to dispense a jet of water in the same drinking receptacle 7 positioned on the drip tray 9. This nozzle is used for the preparation of tea latter. For the preparation of a simple cold tea, this nozzle is not necessary.

A fluid system is provided in the machine to be able to feed hot water in the brewing unit and in the nozzle. A water tank 3 is provided that can be replenished with fresh water. In an alternative embodiment, the water tank can be replaced by a connection to tap water. A water pump 4 transports water from the tank 3 to a water heater 5.

The heater comprises a temperature sensor 14 to control the temperature of the water at the outlet of said heater.

The fluid system comprises a valve 6 enabling the supply of pumped hot water either to the brewing unit 1 or to the nozzle 2. Preferably the valve is a three way solenoid valve feeding hot pumped water to the brewing unit when not energised and feeding hot pumped water to the frothing nozzle wen energized. If the machine does not comprise a frothing nozzle—for example for the preparation of hot and cold teas only—the three way valve can be replaced by a simple commanded two-ort valve stopping the flow of hot pumped water or dispensing said flow to the capsule cage.

The machine comprises a check valve 15 at the water inlet of the needle to guarantee that no hot water is supplied as long as upstream hot water remains under a threshold pressure value. Such a check valve can be for example the valve described in WO 2014/053439.

A control process unit 16 is present to control the actuation of the pump 4, the heater 5 and the valve 6 upon the user actuating or being prompted to press a command 13 on the machine.

The process of preparation of a tea latte with this machine comprises the steps of:
- introducing fresh milk 8 in the drinking receptacle 7 and positioning the receptacle on the drip tray 9, then
- introducing a tea leaves capsule 11 in the brewing unit, then
- actuating the tea latte preparation through the command 13.

The consumer can observe the preparation of frothed milk by the introduction of jets of water in the milk and then the dispensing of tea from the brewing unit 1 inside the frothed milk.

The process of preparation of a cold with this machine comprises the steps of:
- introducing ice cubes in the drinking receptacle 7 and positioning the receptacle on the drip tray 9, then
- introducing a tea leaves capsule 11 in the brewing unit, then
- actuating the cold preparation through the command 13.

The consumer can observe the dispensing of tea from the brewing unit 1 above the ice cubes inside the receptacle.

Figure 2:
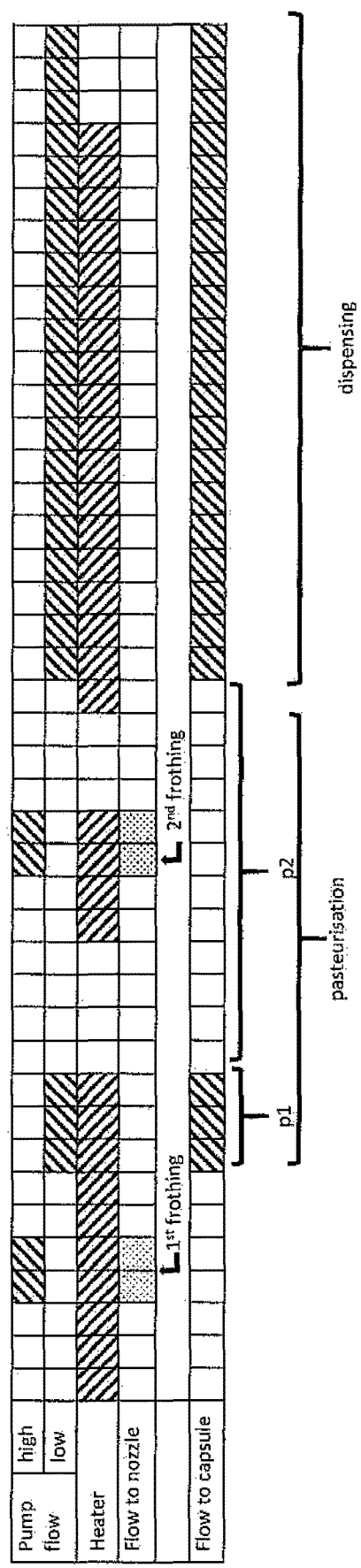
FIG. 2 is a diagram illustrating the process of preparation of a tea latte according to the invention.
Figure 3:
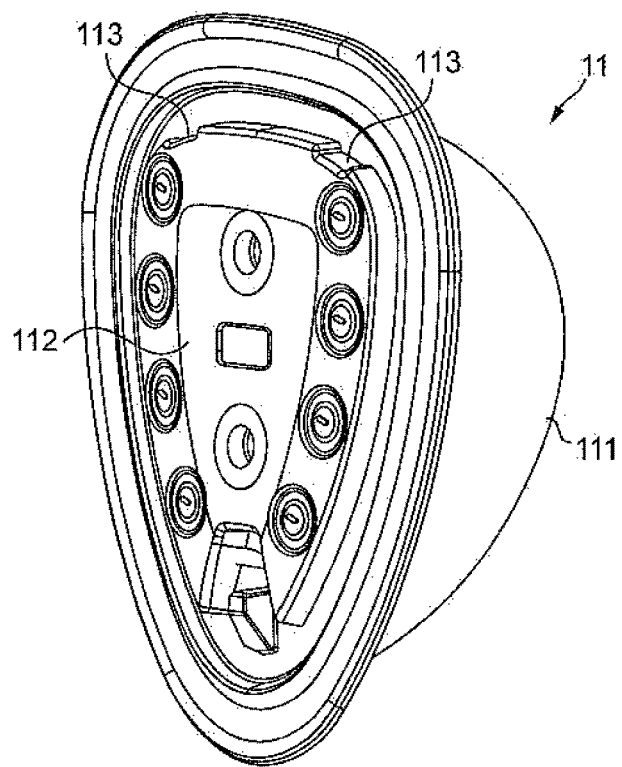
FIGS. 3 and 4 illustrate a capsule particularly adapted for the implementation of the process of the present invention.
Figure 4:
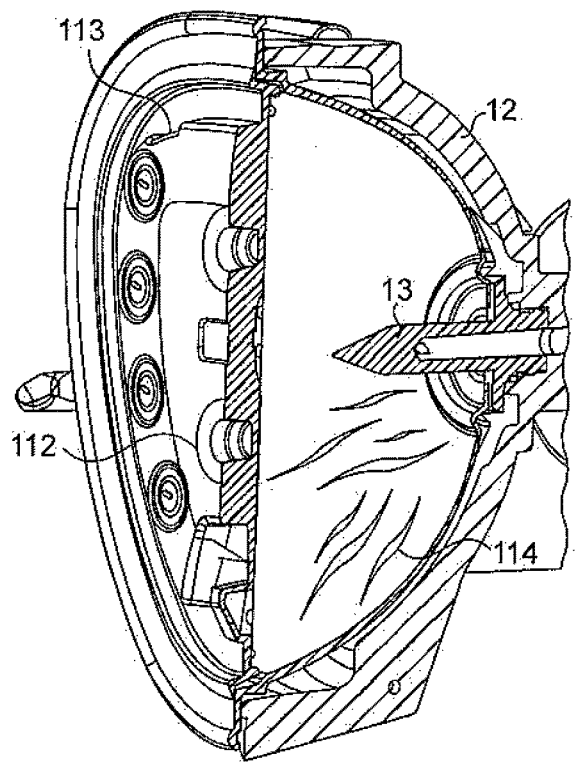

FIG. 2 is a diagram illustrating in details the process of preparation of the tea latte according to the invention within the machine illustrated in FIG. 1 and the capsule illustrated in FIGS. 3 and 4. Precisely the diagram illustrates the actuation of the heater, the pump and the delivery of pumped hot water either to the nozzle or to the capsule along the process of preparation of the tea latte.

First the sequence of preparation of the tea latte comprises the heating of water in the heater in order to be able to provide water at the right temperature.

When the right temperature is reached, that is more than 90° C. at the temperature sensor at the outlet of the heater, the pump is actuated to deliver a flow of hot water to the nozzle for the first frothing step of the milk in the receptacle. The value of this flow rate usually depends from the type of nozzle used. For a nozzle that is a simple conduit presenting an outlet end with a section equivalent to the section of circle of a diameter comprised between 0.2 and 1.0 mm, preferably between 0.3 and 0.9 mm, even more preferably between 0.6 to 0.8 mm, a high flow rate of about 275 ml/min can be implemented. Due to the path of water through the pipe between the heater and the nozzle, water is jetted in the receptacle at a temperature comprised between 95 and 70° C. Then the pump is switched off but the heater keeps on heating water to get the right temperature at the following step.

When the right temperature is reached, that is more than 80° C. at the temperature sensor at the outlet of the heater, the pump is actuated to deliver a flow of hot water to the brewing unit to fill the capsule. This flow rate is usually lower than the flow delivered in the frothing nozzle. For a capsule presenting an internal volume inferior to 20 ml, a low flow rate of about 150 ml/min can be implemented. This filling corresponds to sub-step p1) of the pasteurization, this step is short as the capsule presents an internal volume inferior to 15 ml. The temperature of more than 80° C. at the outlet of the heater guarantees that a temperature of at least 70° C. is reached and kept in the capsule itself. This temperature at the outlet of the heater usually depends from the inertia and the length of the internal parts of the water supplying lines and the nature of the capsule. Accordingly, this temperature at the outlet of the temperature is indicative only and can change from one type of machine to another and from one type of capsule to another. Once the capsule is filled and before tea is dispensed from the capsule inside the receptacle, the pump and the heater are switched off.

In the capsule, sub-step p1) is followed by sub-step p2) wherein no water is introduced in the capsule further and no water dispensed from the capsule either. During these sub-steps p1) and p2) pasteurization of the tea leaves happen. The temperature inside the capsule remains above 70° C. during about 30 seconds which guarantees pasteurization. Simultaneously, tea leaves soak in water, opens and tea extraction begins. This soaking provides an optimal extraction of tea. At the end of the sub-step p1), the heater is switched off in order to avoid the generation of steam in the boiler and the risk this steam pressurizes water in the supply line and said pressurized water opens the check valve. This prevents that an overfilling of the capsule happens and that tea that is not yet pasteurized drops inside the receptacle.

During sub-step p2) and while the tea leaves are pasteurised in the capsule, the heater is switched on again to reach the temperature above 90° C. at the temperature sensor. Simultaneously or once the temperature is reached, the solenoid valve is actuated to dispense any steam or water to the frothing nozzle and not to the brewing unit. Once the right temperature is reached, the pump is actuated to dispense hot water to the nozzle to terminate the frothing of the milk in the receptacle.

Then, the pump and the heater are switched off until the end of the pasteurization step. The valve remains actuated.

Once this step is terminated, pump and heater are actuated to supply hot water to the capsule to brew the tea leaves and dispense tea from the capsule in the receptacle comprising the frothing milk.

During this process the tea leaves have been pasteurised in the capsule. Accordingly, the tea can be safely dispensed in the frothed milk in the receptacle comprising milk at low temperature.

Although the pasteurization step requires a certain time, the process enables a part of the preparation of frothed milk during this pasteurization. As a result, milk can be frothed in two sub-steps: one before the pasteurization and the other during the pasteurization, each time in an optimal way because the heater has been able to heat water at the correct temperature in between.

The heater is not switched on permanently. As a result the generation of steam and the risk said steam pushes additional water through the check valve in the capsule before the end of the pasteurization is low.

As a result, the process enables the preparation of tea latte in a safe manner and at optimal temperature and taste.

Each cell of the diagram of FIG. 2 represents a time length of about 2 seconds meaning that the preparation of the tea latte happens in about 1 min 30 sec.

FIG. 3 illustrates a capsule 11 particularly adapted for the implementation of the process of FIG. 2 with the machine of FIG. 1. The capsule comprises a cup-shaped housing 111 defining an enclosure containing tea leaves. The enclosure is sized to accommodate a dose of tea leaves of typically about between 1 to 10 grams, preferably 2 to 5 grams, and a volume of water of about 20 ml, preferably 15 ml.

The enclosure of the cup shaped-housing is closed by a wall 112. This wall comprises two overflow apertures 113 placed close to the top of the enclosure.

Preferably the capsule comprises a filter to retain fines and small leaves and let tea pass through. Usually at least the overflow apertures are covered by the filter. Preferably the filter extends along the whole wall 112.

FIG. 4 illustrates the capsule of FIG. 3 positioned in the capsule cage 12 of the brewing unit of a machine such as illustrated in FIG. 1. FIG. 4 is a cross section view according to a vertical plane. The brewing unit maintains the capsule so that the overflow wall 112 extends vertically with the overflow apertures 113 of the overflow wall positioned upwardly. The capsule has been pierced by the water injection needle 13. As a result, when hot water is injected through the needle, it is possible to fill almost completely the internal volume of the capsule without dispensing any liquid from the overflow apertures. In particular it is possible to submerge the tea leaves 114 present in the capsule and to pasteurize them without any risk that liquid is dispensed before the end of the pasteurization.

A ring at the base of the needle guarantees that water introduced in the capsule cannot escape from the hole pierced by the needle in the capsule enclosure during the pasteurisation step.

The overflow apertures 113 can be positioned at a lower vertical height of the wall 112 without departing from the invention as long as all the tea leaves present in the enclosure can be submerged. The volume of hot water introduced during step p1 can be adjusted to guarantee the submersion of tea leaves and the absence of dispensing of liquid before the end of the period of pasteurization.

As mentioned earlier, the temperature of hot water introduced in sub-step p1) and the sum of the periods of time of sub-steps p1) and p2) are set to pasteurize the tea leaves comprised in the capsule. Generally the higher the temperature for pasteurization, the shorter the period of time for pasteurization. The minimum values of these parameters can depend from various factors such as: the nature of the material the capsule is made of, the shape and the internal volume of the capsule, the thickness of the wall of the capsule, the nature of the material the capsule cage is made of and/or the time since the last beverage preparation.

For example, with the capsules commercialised under the trademark Special-T by Nestlé® illustrated in FIGS. 3 and 4 and made of plastic, the following Table 1 provides the sum of the periods of time of sub-steps p1) and p2) depending on the temperature of water present in the capsule in order to obtain a pasteurisation of the tea leaves inside the capsule.

TABLE 1

| Temperature inside the capsule (° C.) | Time for sub-steps p1) and p2) (seconds) |
|---|---|
| 70 | 23.8 |
| 71 | 18.9 |
| 72 | 15.0 |
| 73 | 11.9 |
| 74 | 9.5 |
| 75 | 7.5 |
| 76 | 6.0 |
| 77 | 4.7 |
| 78 | 3.8 |
| 79 | 3.0 |
| 80 | 2.4 |
| 85 | 0.8 |
| 90 | 0.2 |
| 95 | 0.1 |

Figure 5:
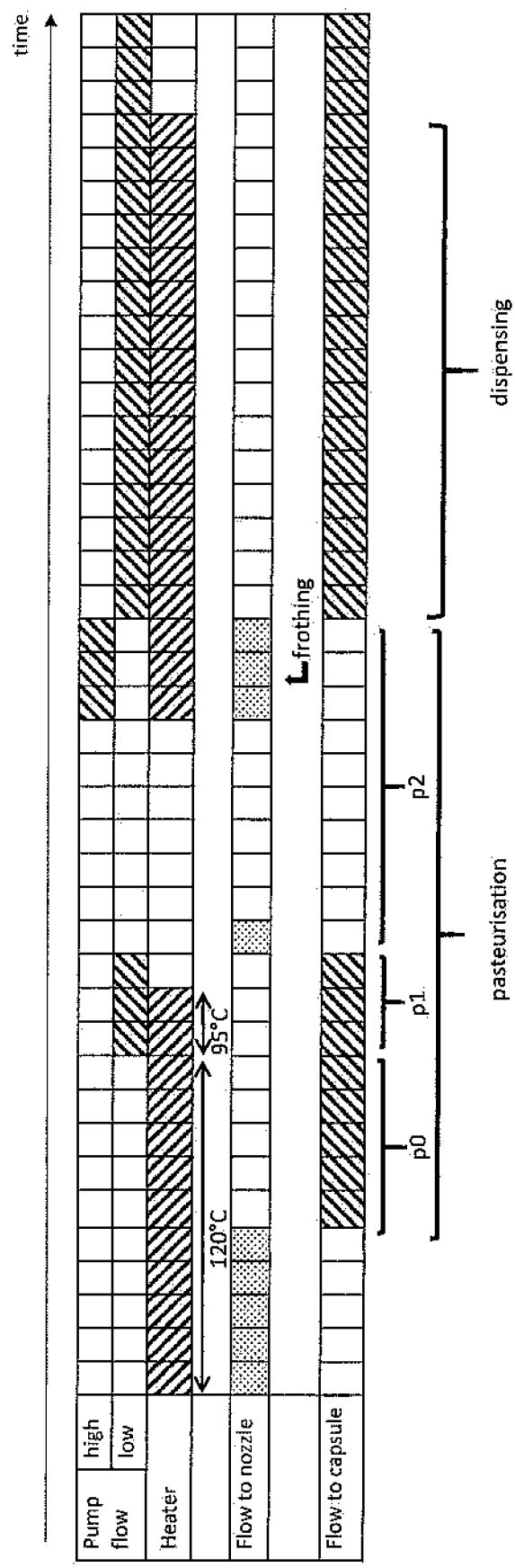
FIG. 5 is a diagram illustrating an alternative process of preparation of a tea latte according to the invention.

FIG. 5 is a diagram illustrating in details a variant of the process of preparation of the tea latte according to the invention within the machine illustrated in FIG. 1 and the capsule illustrated in FIGS. 3 and 4 wherein a step of introduction of steam in the capsule is implemented.

First the sequence of preparation of the tea latte comprises the heating of water in the heater in order to be able to provide water at the right temperature.

Differently from the process described in FIG. 2, the heater is actuated in order to reach a temperature enabling the steaming of water. For example, a temperature of 120° C. is targeted for the steaming of water at the temperature sensor at the outlet of the heater. During this step of production of steam, the valve is actuated to deliver first part of steamed water to the nozzle: this steam forces water present in the frothing nozzle to flow out in the milk and can initiate the frothing of milk in the receptacle.

Then the valve is switched off to introduce steam in the capsule cage and the capsule (sub-step p0). This steam heats the leaves and the capsule. Steaming the leaves initiates their pasteurisation and steaming the capsule reduces the time to reach the pasteurisation temperature necessary to heat the leaves during a time sufficient to get the pasteurisation.

Due to the configuration of the heater or the way to control the water heater, the phase of the fluid produced by the heater changes from steam to hot water. As an example, the heater can be a simple boiler comprising:
   a chamber presenting an inlet for the introduction of the liquid and an outlet for the discharge of the liquid, and
   a heating body contained in the chamber.

Figure 6A:
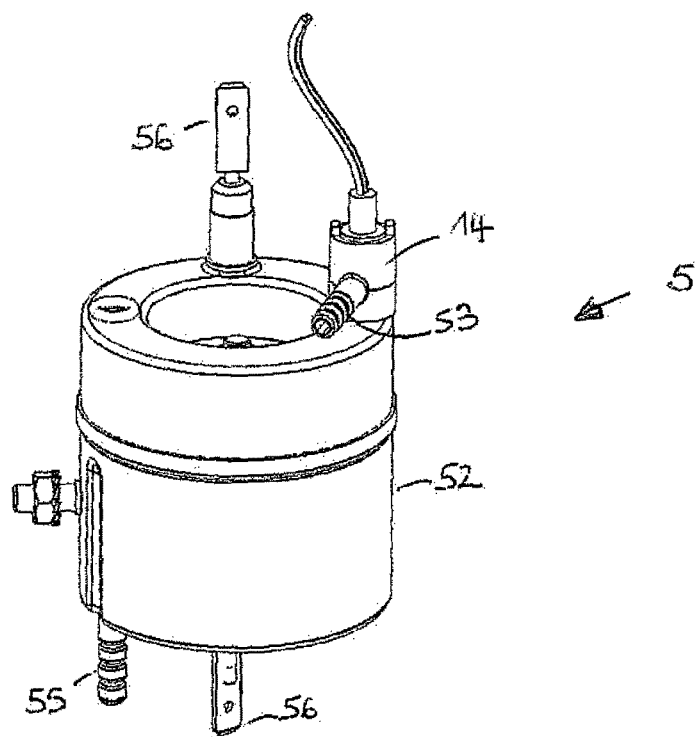
FIG. 6 is a vertical section of a heater configured to be used in the machine implementing the process of the present invention.
Figure 6B:
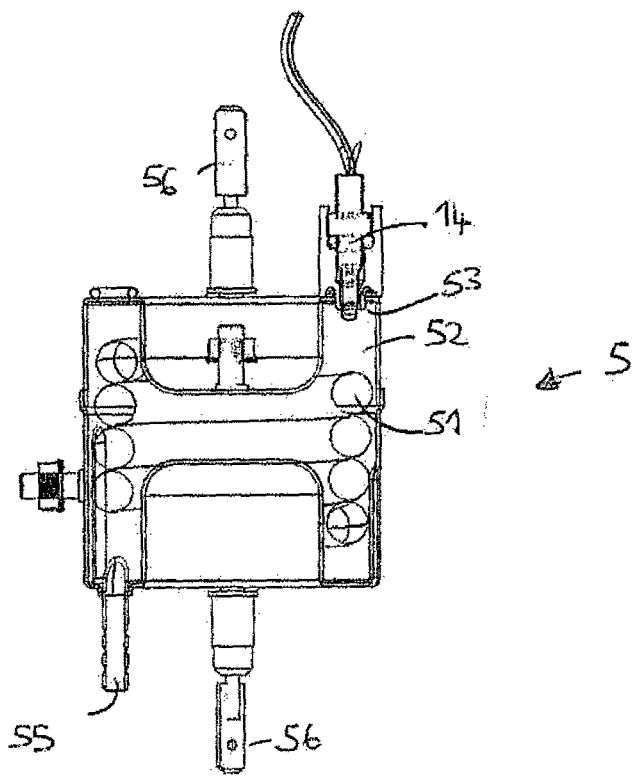

FIGS. 6*a* and 6*b* show perspective view and vertical section view respectively of a heater 5 that can be used in the machine. The heater chamber comprises a heating body 51 that is a resistive element presenting the shape of a spiral. The heater chamber 52 is hollowed along its central axis so as to form a ring in which the spiral of the heating body fits. The heater chamber is hollowed by an upper hollowed part and a bottom hollowed part. Such a type of boiler is described for example in WO 2006002965.

At the liquid outlet 53 of the chamber a temperature sensor 54 can sense the temperature of water before it is delivered out of the heater.

By switching on the heating body without actuating the pump, the steaming of water contained in the chamber of the boiler is reached and steam is discharged by the outlet either to the capsule cage or to the frothing nozzle depending on the position of the valve. When pump is actuated, hot water is dispensed in place of steam.

Going on with the description of the process of brewing of FIG. 5, after steaming of the capsule (sub-step p0), the valve being kept in the position of dispensing fluid to the capsule cage, the pump is actuated to deliver a flow of hot water to the brewing unit to fill the capsule. Similarly to what was described in FIG. 2, the flow rate is preferably low, for example 150 ml/min. This filling corresponds to sub-step p1) of the pasteurization, this step is short as the capsule presents an internal volume inferior to 15 ml. The temperature of about 95° C. at the outlet of the heater guarantees that a temperature of at least 70° C. is reached and is maintained in the capsule itself. Again, this temperature at the outlet of the heater usually depends on the inertia of the internal parts of the water supplying lines and the nature of the capsule. Accordingly, this temperature at the outlet of the temperature is indicative only and can change from one type of machine to another and from one type of capsule to another.

Then the pump and the heater are switched off. The heater can be switched off a little bit earlier than the pump if the temperature of water introduced in the capsule is high enough. In the capsule, sub-step p1) is followed by sub-step p2) wherein no water is introduced in the capsule further and no water dispensed from the capsule either. During these sub-steps p1) and p2), pasteurization of the tea leaves happen. The temperature inside the capsule remains largely above 70° C. during about 30 seconds which guarantees pasteurization. Simultaneously, tea leaves soak in water, open and tea extraction begins. This soaking provides an optimal extraction of tea. At the end of the sub-step p1), the heater is switched off in order to avoid the generation of steam in the boiler and the risk this steam pressurizes water in the supply line and said pressurized water opens the check valve. In addition, the valve can be simultaneously rapidly switched to the frothing nozzle to release any remaining pressure (at the beginning of sub-step p2) in the diagram).

During the last part of the sub-step p2) and while the tea leaves are pasteurised in the capsule, the heater is switched on again. Simultaneously or once a sufficient temperature is reached, the valve is actuated to dispense steam or water to the frothing nozzle and not to the brewing unit. Once the right temperature is reached, the pump is actuated to dispense hot water at high flow rate to the nozzle to froth the milk in the receptacle while the tea leaves are pasteurized in the capsule.

Then, while the valve is switched off to provide fluid to the capsule, pump and heater remain actuated to supply hot water to the capsule to brew the tea leaves and dispense tea from the capsule in the receptacle comprising the frothing milk.

During this process the tea leaves have been pasteurised in the capsule. Accordingly, the tea can be safely dispensed in the frothed milk in the receptacle comprising milk at low temperature.

Although the pasteurization step requires a certain time, the process enables a part of the preparation of frothed milk during this pasteurization. As a result, milk can be frothed during the pasteurization in an optimal way because the heater has been able to heat water at the correct temperature in between.

Each cell of the diagram of FIG. 5 represents a time length of about 2 seconds meaning that the preparation of the tea latte happens in less than 1 min 30 sec.

Figure 7:
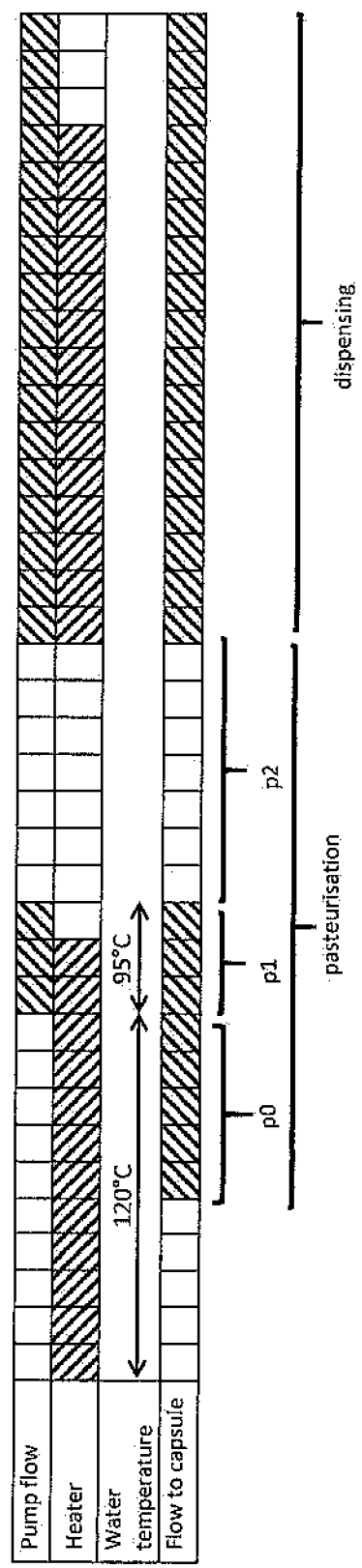
FIG. 7 is a diagram illustrating a process of preparation of a cold tea according to the invention.

FIG. 7 is a diagram illustrating in details a process of preparation of cold tea according to the invention within the machine illustrated in FIG. 1 and the capsule illustrated in FIGS. 3 and 4 wherein a step of introduction of steam in the capsule is implemented.

First the sequence of preparation of the cold tea comprises the heating of water in the heater in order to be able to provide the capsule with water at the right temperature.

Similarly to the process described in FIG. 5, the heater is actuated in order to reach a temperature enabling the steaming of water. For example, a temperature of 120° C. is targeted for the steaming of water at the temperature sensor at the outlet of the heater. During this step of production of steam, the valve is actuated to deliver first part of steamed water to the nozzle (not illustrated in the diagram): this steam forces water present in the frothing nozzle to flow out in the receptacle rather than in the capsule.

Then the valve is switched off to introduce steam in the capsule cage and the capsule. This steam heats the leaves and the capsule (sub-step p0). Steaming the leaves initiates their pasteurisation and steaming the capsule reduces the time to reach the temperature necessary to heat the leaves during a time sufficient to get the pasteurisation.

Then the pump is actuated to deliver a flow of hot water to the brewing unit to fill the capsule. Similarly to what was described in FIG. 2, the flow rate is preferably low, for example of about 150 ml/min. This filling corresponds to sub-step p1) of the pasteurization, this step is short as the capsule presents an internal volume inferior to 15 ml. The temperature of about 95° C. at the outlet of the heater guarantees that a temperature of at least 70° C. is reached and kept in the capsule itself. Again, this temperature at the outlet of the heater usually depends on the inertia of the internal parts of the water supplying lines and the nature of the capsule. Accordingly, this temperature at the outlet of the temperature is indicative only and can change from one type of machine to another and from one type of capsule to another. Then the pump and the heater are switched off. The heater can be switched off a little bit earlier than the pump if the temperature of water introduced in the capsule is high enough. In the capsule, sub-step p1) is followed by sub-step p2) wherein no water is introduced in the capsule further and no water dispensed from the capsule either. During these sub-steps p1) and p2) pasteurization of the tea leaves happen. The temperature inside the capsule remains largely above 70° C. during about 30 seconds which guarantees pasteurization. Simultaneously, tea leaves soak in water, opens and tea extraction begins. This soaking provides an optimal extraction of tea. Before the end of the sub-step p1), the heater is switched off in order to avoid the generation of steam in the boiler and the risk this steam pressurizes water in the supply line and said pressurized water opens the check valve. In addition, the valve can be simultaneously rapidly switched to the frothing nozzle to release any remaining pressure (not illustrated in the diagram).

Then, at the end of sub-step p2), pump and heater are actuated to supply hot water to the capsule to brew the tea leaves and dispense tea from the capsule in the receptacle. The temperature of water dispensed by the heater and the flow of said water are adapted on account of the desired temperature of the final cold tea. Low temperature and high flow provides a rather low temperature for the final tea. The tea can be dispensed in a receptacle comprising ice cubes in order to reduce the temperature of consumption and without any safety risk since the pasteurisation of the tea leaves happened previously in the capsule. Each cell of the diagram of FIG. 7 represents a time length of about 2 seconds meaning that the preparation of the cold tea happens in about 1 min 20 sec.

In a variant, this process of FIG. 7 can be implemented without the steaming step p0). In that case, the temperature and the length of the periods p1) and p2) are adapted to guarantee the pasteurisation effect.

In a variant, this process of FIG. 7 can be implemented with a machine devoid of frothing nozzle and valve enabling the distribution to said nozzle. In that case the process of FIG. 7 is preferably implemented without the steaming step p0) as mentioned just above.

Although the invention has been described with reference to the above illustrated embodiments, it will be appreciated that the invention as claimed is not limited in any way by these illustrated embodiments.

Effective pasteurisation was controlled in all the processes of preparation of tea beverages described above. The control comprised the steps of injecting test organism in capsules with a syringe, introducing the contaminated capsule in the machine and preparing a tea latte or a cold tea beverage. Beverage was analysed using pour plating technique and incubating plates. Finally colonies were counted. Efficient pasteurisation was observed by difference between the log number of cells injected and the log number of cells recovered in the beverage.

Variations and modifications may be made without departing from the scope of the invention as defined in the claims. Furthermore, where known equivalents exist to specific features, such equivalents are incorporated as if specifically referred in this specification.

As used in this specification, the words "comprises", "comprising", and similar words, are not to be interpreted in an exclusive or exhaustive sense. In other words, they are intended to mean "including, but not limited to".

LIST OF REFERENCES IN THE DRAWINGS tea brewing unit 1
frothing nozzle 2
water tank 3
pump 4
water heater 5
   heating body 51
   heater chamber 52
   water or steam outlet 53
   temperature sensor 54
   water inlet 55
   electric supply 56
valve 6
receptacle 7
milk 8
drip tray 9
tea brewing machine 10
tea leaves capsule 11
   cup-shaped housing 111
   wall 112
   overflow aperture 113
   tea leaves 114
capsule cage 12
water needle 13
temperature sensor 14
check valve 15
process control unit 16

The invention claimed is:

1. A process for preparing a tea in a drinking receptacle with a tea brewing machine, the tea brewing machine being configured:
to brew the tea from a capsule, the capsule comprising tea leaves, by introducing hot water in the capsule and dispensing the tea from the capsule in the drinking receptacle, the drinking receptacle containing a cold liquid, an ambient liquid, or ice, and
to pump and heat water to provide the hot water, and to dispense the hot water to the capsule,
wherein the process comprises pasteurization of the tea leaves inside the capsule before dispensing the tea from the capsule inside the drinking receptacle,
wherein the pasteurization comprises steps of:
p1: introducing the hot water in the capsule until the tea leaves are submerged by the hot water inside the capsule and stopping the introducing of the hot water before the tea is dispensed to the drinking receptacle, wherein the hot water is introduced for during a first period of time, and
p2: keeping the tea leaves submerged in the hot water for a second period of time,
wherein a temperature of the hot water introduced in the step p1 and a sum of the first period of time and the second period of time before dispensing the tea from the capsule are set to pasteurize the tea leaves in the capsule;
wherein the capsule has an internal volume inferior to 20 ml, the temperature of the hot water introduced in the step p1 is set to get a temperature of at least 70° C. in the capsule during the sum of the first period of time and the second period of time, and the sum of the first period of time and the second period of time is at least 7 seconds and is less than 30 seconds.

2. The process according to claim 1, wherein the temperature of the hot water introduced at the step p1 is at least 72° C.

3. The process according to claim 1, wherein the capsule is made of a plastic material, and wherein the sum of the first time period and the second time period is at least 15 seconds.

4. The process according to claim 1, wherein the capsule is made of a plastic material, and wherein the temperature of the hot water in the capsule introduced at step p1 is set to get a temperature of 75° C.

5. The process according to claim 1, wherein the step of pasteurisation comprises a step p0 before the step p1, and the step p0 comprises introducing water steam in the capsule.

6. The process according to claim 1, wherein the tea brewing machine is configured:
to froth milk present in the drinking receptacle by jetting additional hot water from at least one hot water nozzle in the milk;
to pump and heat water to provide the additional hot water and to dispense the additional hot water to the at least one hot water nozzle,
wherein the process implements the pasteurization of the tea leaves inside the capsule before dispensing the tea from the capsule to the frothed milk inside the drinking receptacle.

7. The process according to claim 6, wherein at least a part of the milk frothing step happens during the step p2 of the pasteurization.

8. The process according to claim 6, wherein a part of the milk frothing step happens before the step p1 of the pasteurization begins.

9. The process according to claim 6, wherein the temperature of the additional hot water introduced during the milk frothing step is at least 70° C.

10. The process according to claim 6, wherein a flow of the additional hot water introduced during the milk frothing step is at least 250 ml/min.

11. The process according to claim 1, wherein the capsule comprises:

an enclosure containing the tea leaves;
an overflow wall at a beverage outlet side of the capsule, the overflow wall comprising at least one overflow aperture; and
wherein the tea brewing machine is configured to receive the capsule and to orient the capsule with the at least one overflow aperture positioned upwardly inside the tea brewing machine.

12. A beverage machine for preparing tea beverages from tea leaves capsules, the beverage machine comprising:
a tea leaves capsule brewing unit;
a hot water supply unit, the hot water supply unit comprising at least: a water tank, a water pump, and a water heater; and
a control process unit being configured to control the water pump and the water heater to implement a process for preparing a tea beverage in a drinking receptacle, the drinking receptacle containing a cold liquid, an ambient liquid, or ice, the beverage machine being configured to brew the tea beverage from the tea leaves capsule by introducing hot water in the tea leaves capsule and dispensing the tea beverage from the tea leaves capsule to the drinking receptacle, and to pump and heat water to provide the hot water and dispense the hot water to the tea leaves capsule, wherein the process comprises a step of pasteurization of tea leaves inside the tea leaves capsule before dispensing the tea beverage from the tea leaves capsule inside the drinking receptacle, wherein the pasteurization step comprises steps of:
p1: introducing the hot water in the tea leaves capsule until the tea leaves are submerged by the hot water inside the tea leaves capsule and stopping the introducing of the hot water before the tea beverage is dispensed to the drinking receptacle, wherein the hot water is introduced for a first period of time, and
p2: keeping the tea leaves submerged in the hot water for a second period of time,
wherein a temperature of the hot water introduced in the step p1 and the sum of the first period of time and the second period of time before dispensing the tea beverage from the tea leaves capsule are set to pasteurize the tea leaves in the tea leaves capsule; and
wherein the capsule has an internal volume inferior to 20 ml, the temperature of the hot water introduced in the step p1 is set to get a temperature of at least 70° C. in the capsule during the sum of the first period of time and the second period of time, and the sum of the first period of time and the second period of time is at least 7 seconds and is less than 30 seconds.

13. A beverage machine comprising:
a water nozzle,
a valve configured for connecting hot water to a brewing unit and to the water nozzle, the valve configured to receive the hot water from a pump and a heater, and
a control process unit configured to control the pump, the heater, and the valve to implement a process for preparing a tea in a drinking receptacle, the drinking receptacle containing a cold liquid, an ambient liquid, or ice, the beverage machine being configured to brew the tea from a capsule, the capsule comprising tea leaves, by introducing the hot water in the capsule and dispensing the tea from the capsule to the drinking receptacle, and to pump and heat water to provide the hot water and dispense the hot water to the capsule, wherein the process comprises a step of pasteurization of the tea leaves inside the capsule before dispensing the tea from the capsule inside the drinking receptacle, wherein the pasteurization step comprises steps of:
p1: introducing the hot water in the capsule until the tea leaves are submerged by the hot water inside the capsule and stopping the introducing of the hot water before the tea is dispensed to the drinking receptacle, wherein the hot water is introduced for a first period of time, and
p2: keeping the tea leaves submerged in the hot water for a second period of time,
wherein a temperature of the hot water introduced in the step p1 and the sum of the first period of time and the second period of time before dispensing the tea from the capsule are set to pasteurize the tea leaves in the capsule;
wherein the capsule has an internal volume inferior to 20 ml, the temperature of the hot water introduced in the step p1 is set to get a temperature of at least 70° C. in the capsule during the sum of the first period of time and the second period of time, and the sum of the first period of time and the second period of time is at least 7 seconds and is less than 30 seconds.

14. The beverage machine according to claim 13, further comprising a needle to inject the hot water in the capsule and a check valve at a water inlet of the needle,
the valve is a distributor valve configured to feed the hot water or steam to the brewing unit by default, and
wherein the beverage machine is configured to froth milk present in the drinking receptacle, wherein at least a part of the milk frothing step happens during the step p2 of the pasteurization, and wherein the control process unit is configured to switch off the heater during the pasteurization except during the part of the milk frothing step happening during the step p2 of the pasteurization.

* * * * *